United States Patent [19]

Amundsen et al.

[11] Patent Number: 4,825,435
[45] Date of Patent: Apr. 25, 1989

[54] MULTIPORT REPEATER

[75] Inventors: Keith B. Amundsen, Arlington; Richard P. Evans, Bolton; Richard C. Friess, Leominster; Robert J. Souza, Acton; Barry C. Zink, Sudbury, all of Mass.

[73] Assignee: Digital Equipment Corp., Maynard, Mass.

[21] Appl. No.: 796,470

[22] Filed: Nov. 8, 1985

[51] Int. Cl.$^4$ .............................................. H04J 3/02
[52] U.S. Cl. ......................................... 370/97; 370/85
[58] Field of Search ................ 370/85, 86, 94, 55, 370/88, 97, 31; 375/3, 4; 455/7, 14, 15, 16

[56] References Cited

U.S. PATENT DOCUMENTS

| | | | |
|---|---|---|---|
| 3,889,064 | 6/1975 | Fletcher | 370/85 |
| 4,228,535 | 10/1980 | Workman et al. | 370/16 |
| 4,334,306 | 6/1982 | Ulug | 370/94 |
| 4,347,498 | 9/1982 | Lee et al. | 370/94 |
| 4,399,531 | 8/1983 | Grande et al. | 370/94 |
| 4,417,334 | 11/1983 | Gunderson et al. | 370/16 |
| 4,425,662 | 1/1984 | Jeandot | 375/4 |
| 4,597,079 | 6/1986 | Aoki et al. | 370/16 |
| 4,598,399 | 7/1986 | Bath | 370/16 |
| 4,646,361 | 2/1987 | Usui | 370/85 |

Primary Examiner—Douglas W. Olms
Assistant Examiner—Wellington Chin
Attorney, Agent, or Firm—Michael N. Meller

[57] ABSTRACT

A multiport repeater "Hub" for interconnecting a plurality of transceiver cables to a local area network transceiver port. The hub also has an external bus which can be employed for daisy chaining up to a total of eight Hubs as a single connection to the transceiver port.

9 Claims, 23 Drawing Sheets

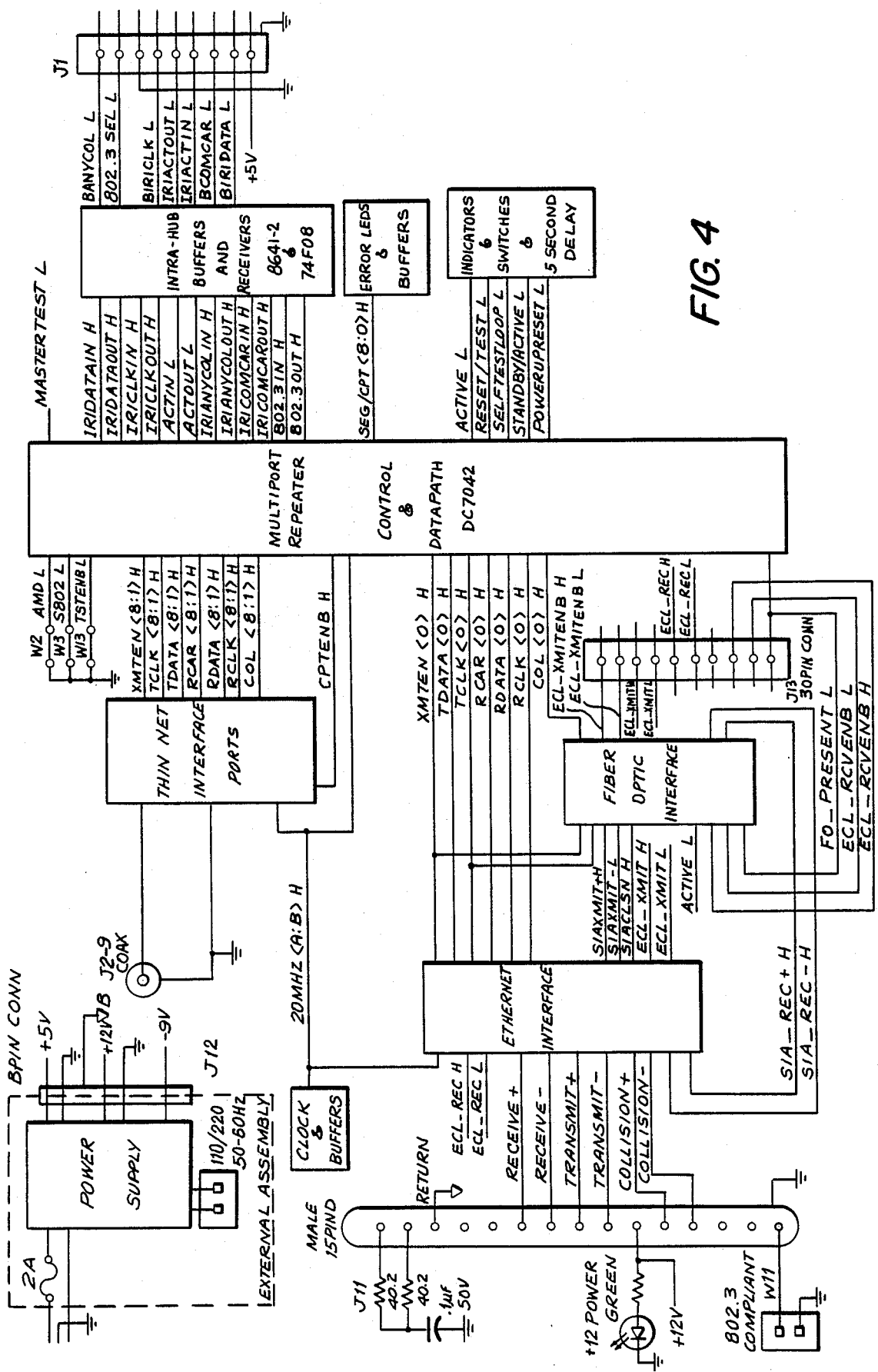

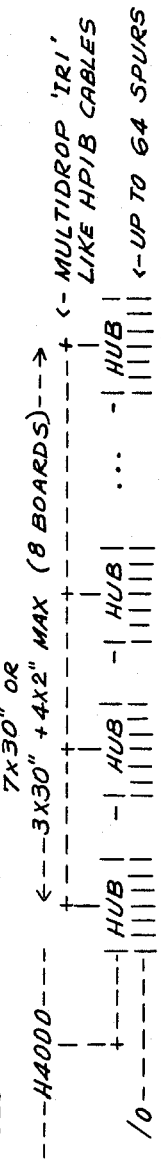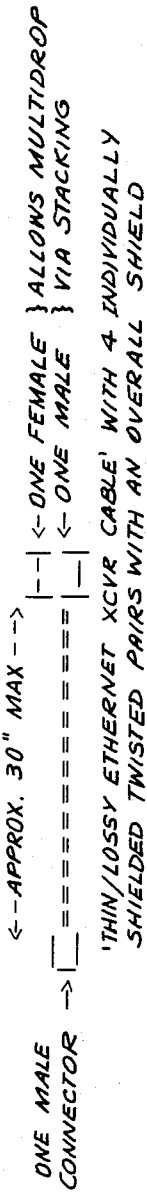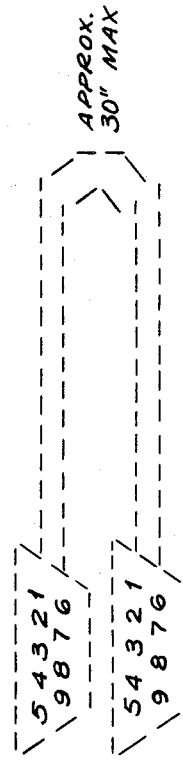
FIG. 9

MULTIPORT REPEATER

BACKGROUND OF THE INVENTION

A multiport repeater, hereinafter "Hub", is an integral part of Digital Equipment Corporations Ethernet wiring system for local area networks (LANs). A multiport repeater is a device which performs signal conditioning on a received signal, wherein, the signal is amplified and timing margins are restored. The product announcement for this wiring system is incorporated by reference. This system is designed to deliver ten megabits per second Ethernet peformance and full DECnet (DECnet refers to Digital Equipment Corporation's networking capability) functionality to the desk and work area for connection of PCs, workstations, network servers, and low-end computing devices.

Standard Ethernet cabling (particularly transceiver cable) and transceivers are expensive and difficult to use for attaching equipment in the work area. Whereas, the system of the invention meets office and work area requirements by offering low-cost, flexible, and easy to install cables, thus improving flexibility and reducing the cost of standard Ethernet products for the user environment. Additionally, the system of the invention provides for a "radial" wiring scheme. The hub, configured radially, connects eight thin coaxial cable segments (RG58), each up to 185 meters in length. Up to twenty-nine (29) workstations can be serially "daisy-chained" on each segment. Since the thin cable of the invention is limited to a range of 185 meters, the radial topology provides for an extensive LAN which is not possible with a single run of thin cable. The hub can be implemented by itself in a stand alone network hub, or, connected to a standard Ethernet "backbone".

Both the improved Ethernet system of the invention and the standard Ethernet system have distinct advantages in different environments. The two wiring schemes are compatible and can be interconnected for resource sharing across an entire network. The combination of standard Ethernet and the improved Ethernet system of the invention offers excellent natural growth from small resource sharing networks to large global networks.

Standard Ethernet products use an H4000 transceiver (or the new H4005 transceiver) which taps directly into an Ethernet coaxial cable. The H4000 (15-pin D connector) is coupled to the hub (15-pin D connector) by a transceiver cable.

The cabling system of the invention employs a technique called daisy-chaining, wherein a different tap, called a T-Connector, is used to join two segments of RG58 C/U cable. The bottom of the "T" is inserted directly into a PC/Workstation. Devices connected to the cable either have an integral Ethernet controller and transceiver functionality, or have a "ThinWire Ethernet Station Adapter" (DESTA) to adapt the device for use with thin cabling.

The Ethenet cabling system of the invention will best serve users in the floor area of a facility, wherein standard Ethernet cabling techniques are employed between floors and buildings at a customer site. For example, the three major configurations for the cabling system of the invention include work area networks, standalone LANs and global LANs.

Work area networks are defined as small standalone local area networks, wherein multiple PC/Workstation users in a work area share resources, such as printers and storage devices.

Standalone LANs are defined as small- to medium-sized standalone LANs in a small business, or in the department of a larger organization, where PC/Workstation users have the need for local resource sharing, including more powerful computing resources. The hub can be used in a radial topology to interconnect PCs, servers and computers in a work area or throughout the floor of a building. Each of the eight coaxial cable segments that connect to the hub can accommodate up to twenty-nine (29) stations. A segment can be up to 185 meters long. Therefore, a single hub has the potential of interconnecting up to 232 stations.

Global LANs are defined as medium-to-large-sized LANs which serve a large corporation or medium-sized business whose users need local resource sharing, as well as substantial computing access. In this case, the improved system of the invention serves as a subnetwork which is connected to the standard Ethernet "backbone" for access to network computing resources on the large Ethernet and at remote locations.

In this case, many smaller LANs are connected to the standard Ethernet backbone with the H4000 or H4005-B transceiver. (A description of the new H4005 transceiver is incorporated by reference).

The cabling system of the invention employs the hub and associated thin cabling in a radial fashion, originating in satellite closets to serve the facility floor.

When the hub is placed in satellite distribution closets and uninterrupted (i.e., not daisy-chained) the system employs runs of RG58 C/U cable from the hub directly to a wall plate mounted in an office. This maintains the integrity of the cable system and provides for proper management of the network cabling system.

Users can connect a length of RG58 C/U cable from a station to the wall plate. Within the office, PCs or servers could be daisy-chained. By installing eight hubs in a satellite closet, up to 64 offices could be served, and a much large number of devices can be connected to the network via daisy-chaining in the offices.

In the improved Ethernet cabling system of the invention, standard Ethernet is specified to interconnect floors within a building, and the buildings of a site. Standard Ethernet coaxial cable is designed with lower signal attenuation than the thin cable of the invention, allowing longer cableruns. It also has a somewhat higher resistance to EMI/RFI and has high quality connectors (this accounts for it being more expensive).

These features are critical for the cabling used between floors and closets, since it is generally less accessible than floor wiring. Standard Ethernet provides the cabling integrity required for interconnection of thin cable subnetworks and large numbers of devices. The thin cable system of the invention is better suited for attachment of devices on the floor itself.

In order to serve up to 64 offices from a wiring closet, it is necessary to configure multiple hubs in a closet.

A Digital Equipment local network interconnect (DELNI) may be used as a concentrator for up to eight hubs in either a standalone or global configuration. In both cases, a network with the potential to connect over 1,000 daisy-chained devices can be configured. (8 hubs×8 segments/hub×29 stations/segment; 1,024 is the Ethernet limit.)

When part of a global configuration, the DELNI/hub "sub-network" is connected to the standard Ethernet backbone with an H4005-B transceiver. In local configurations, the DELNI/hub configuration is simply NOT connected to a standard Ethernet segment.

The hub serves as a repeater between all stations attached to it. When it is connected to a standard Ethernet, it functions as a repeater between all stations attached to it and all devices connected to the standard Ethernet. The hub must be counted as a full repeater when configuring an Ethernet LAN. The hub has repeater logic between all ports, including partitioning logic which fault isolates each office when an office has its own dedicated port.

Since each hub counts as a repeater, only one other repeater can be configured in the path between the hub and any station on the rest of the Ethernet.

For configuration simplicity, it is recommended that bridges (DEBET) rather than repeaters (DEREP) be used between standard Ethernet segments where hubs are attached.

SUMMARY OF THE INVENTION

Accordingly, the present invention aims to provide an improved radial Ethernet cabling system which is both cheaper and more flexible than the standard Ethernet cabling system.

Another object of the invention is to provide a radial Ethernet cabling system which employs a series of radial hubs coupled together in a daisy-chain fashion, wherein, the hubs are located in a "satellite closet" to serve each floor of a facility.

In the preferred embodiment, the invention is a standalone multiport repeater or hub, used to interconnect eight (8) ports and act as a repeater for each port. The hub is capable of interconnecting to a standard Ethernet transceiver port. The hub also has an external bus for the daisy-chaining of up to a total of eight (8) hubs as a single connection to the Ethernet.

Another object of the invention is to provide high speed LAN performance to each office or work area in a manner that matches existing radial wiring techniques; that is fault isolated from all other office drops; that is economical; that uses Ethernet technology, but, with cabling that is thinner and more suited to offices; that is compatible with building-wide and site-wide wiring; and that complies with the IEEE Ethernet standards. This is done by conceiving a multiport repeater that has one Ethernet transceiver cable port for connection to a building-wide Ethernet; that can have a fiber-optic inter-repeater link (IRL) port as an alternative connection to a building-wide or site-wide Ethernet; that has multiple Ethernet ports so that the single Ethernet connection and common components can be shared, where each one is nominally dedicated for a single office, and so it is the hub for multiple segment connections; that has repeater logic between all ports including partitioning logic which fault isolates each office coaxial cable termination for the end of each segment that connects to the hub; that can provide the single-point-ground for each segment; that meets the applicable IEEE standards and drafts; and that might have other features.

These concepts are applicable to other LAN technologies; however, the preferred embodiment is directed towards 10Mb/s Ethernet/IEEE-802.3.

Operation of the hub is compatible with the Digital Ethernet Specification (DEC Standard 134).

The invention accordingly comprises the features of construction, combination of elements and arrangement of parts which will be exemplified in the following detailed description, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 4 is a circuit diagram illustrating the hub, interface ports, Ethernet interface port, fiber optic interface ports, intra-hub interconnect, power supply, indicators and switches.

FIG. 9 is a diagram illustrating a cluster of hubs coupled together in a daisy-chain fashion and a diagram of the intra repeater interconnect cable.

DESCRIPTION OF THE PREFERRED EMBODIMENT

Figure 1:
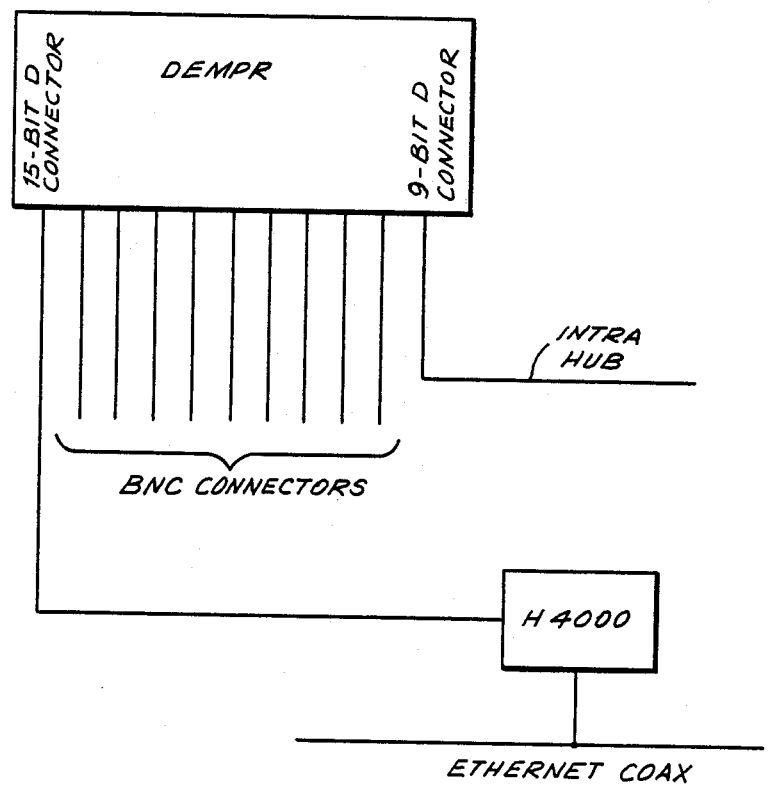
FIG. 1 is a block diagram illustrating the hub, and, its interconnection to an Ethernet coaxial cable through a H4000 transceiver, its eight BNC connectors and an external bus for intra hub interconnects.

Referring to FIG. 1 of the drawings, the hub is a self-contained unit requiring AC power and having 8 BNC style connectors for eight ports. The unit has two other ports, one 15-pin female "D" for the connection of up to 8 hubs in a daisy-chain fashion. The 9-pin port is the intra repeater interconnect for the hub and provides for intra hub connection.

The 8 BNC connectors and the transceiver connection will hereinafter be referred to as "ports". The intra repeater interconnect will hereinafter be referred to as the IRI.

The hub treats all of the ports and the IRI as a common data bus via a gate array that will perform all of the arbitration for the usage of the ports. The joining of the ports creates a larger Ethernet. The hub is not an Ethernet addressable unit on the network. It passes all data that is received on any one port to all other ports and the IRI. The unit has a 32-bit buffer for regeneration of the preamble of the received packets.

An optional fiber optic interconnect (IRL) is provided so that the hub can be used in harsh environments or for electrical isolation. The module is installed in a 30-pin vertical connector and a cover on the rear panel is removed.

AC power is provided to the unit via a single standard (3-prong), IEC connector. The AC power is not switched to prevent the accidental loss of power to the unit. The unit when powered down exhibits no load at any of the ports. It does however disable the daisy-chain if the IRI is in use. (A jumper cable will be provided if the IRI is in use and a unit is being repaired.)

The hub is used to expand the topology of the system in accordance with the invention to the much larger Ethernet and connect up to 64 ports with the IRI to the Ethernet via a single transceiver interconnection. The hub restores the noise and timing margins as signals are propagated through the unit to the other ports attached to the hub.

The passing of data from one port to eight other ports is not a simple switching task. The timing differences of the ports require the buffering of the received data in a FIFO fashion. Collisions on any port on the network need to be passed on to all of the other ports and the IRI. The data that is received is decoded via a single chip Manchester encoder/decoder, wherein the data and the clock are separated for usage in the gate array. All packets that are received will have the 64-bit preamble restored as it is repeated to the other ports.

The normal operation of the hub is as follows:
1. A receive is detected on one of the ports.
2. A preamble is sent to all of the other 8 ports and the IRI.
3. The end of the preamble is detected at the receiving port and the replication of the data on the other ports and the IRI is begun.
4. The collision detect input from all ports is continuously monitored and enforced for all other ports as collisions occur.

There are four major states to the repeater process: Idle, Repeat, Collision and Wait. These 4 states are the basis of the global state machine and determine the state of the hub. The next state transition terms, such as IR (idle to repeat) are then defined in terms of the inputs to the state machine and determine when the state machine should transition from one state to another. The global state machine determines whether the hub is idle, repeating a packet or jamming a port if there is a collision.

The transmission to each port is controlled by a one-bit XMIT state machine. The global present state and the global next state terms and other inputs determine whether the XMIT bit should be on or off. There is one XMIT state machine for each port of the hub. The one-bit state machines along with the global state machine satisfy all the transition terms of the 802 spec.

Figure 2:
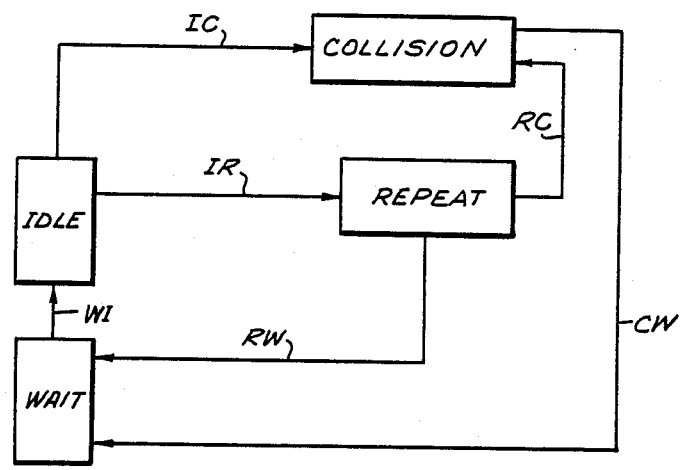
FIG. 2 is a state machine flow diagram illustrating the timing of information packets during transmission through the hub.
Figure 3:
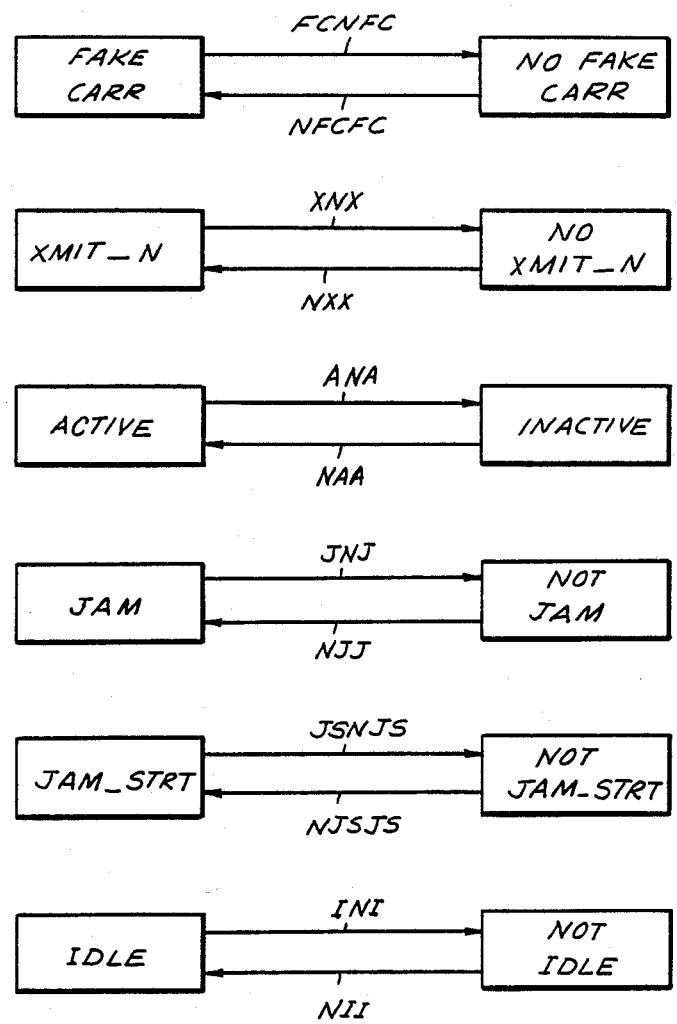
FIG. 3 is an output state machine flow diagram illustrating the output control ports on the hub.
Figure 5A:
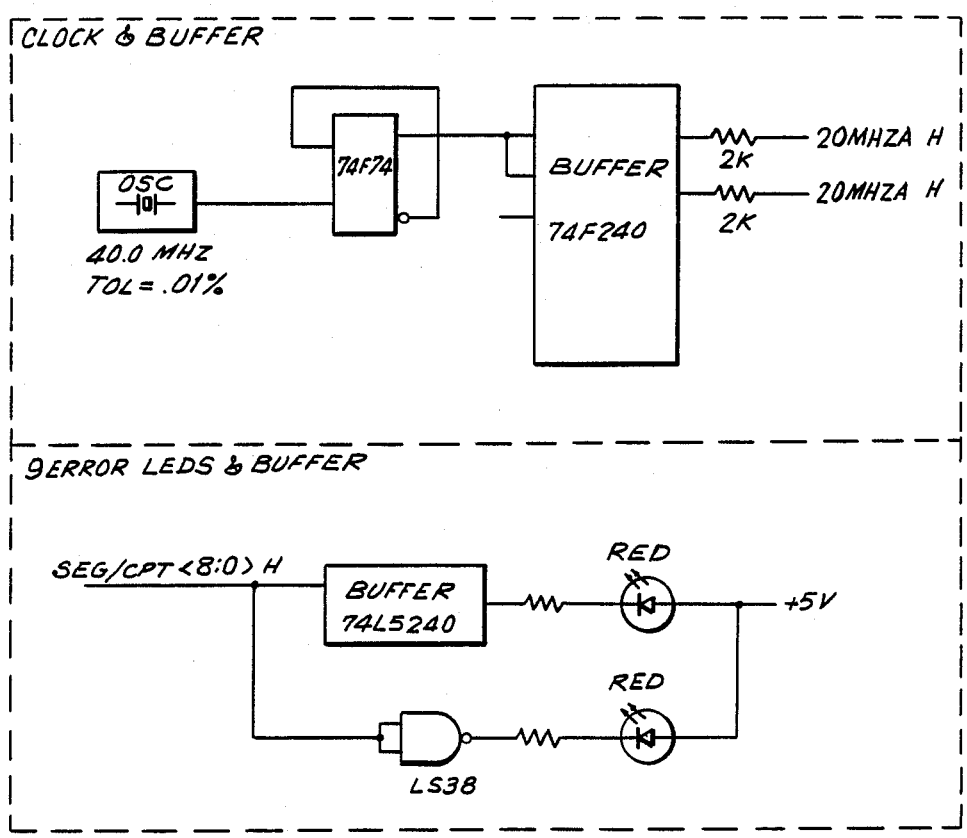
FIG. 5A is a circuit diagram illustrating the clock and buffer, error LED's and buffers
Figure 5B:
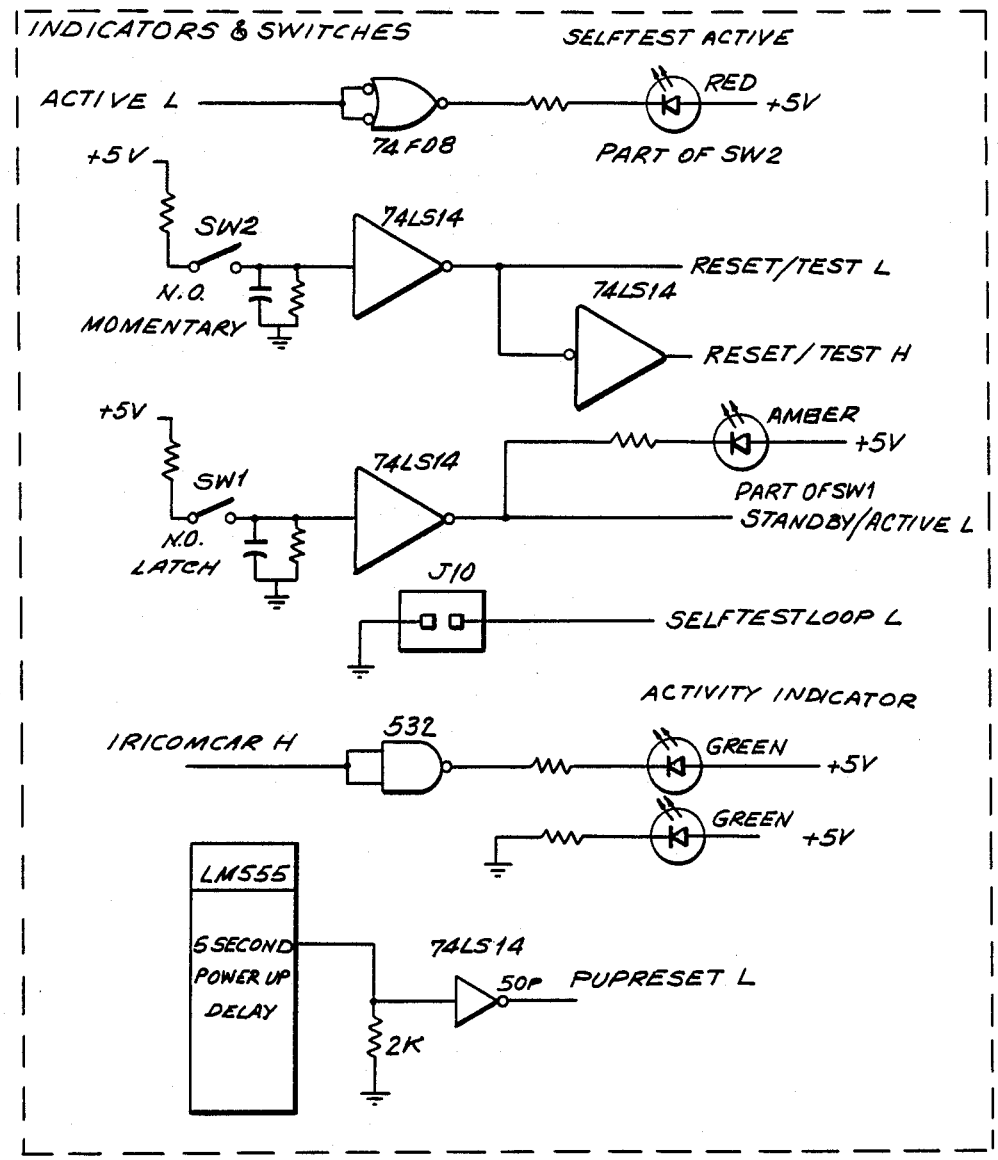
FIG. 5B is a circuit diagram illustrating the indicators and switches.
Figure 6:
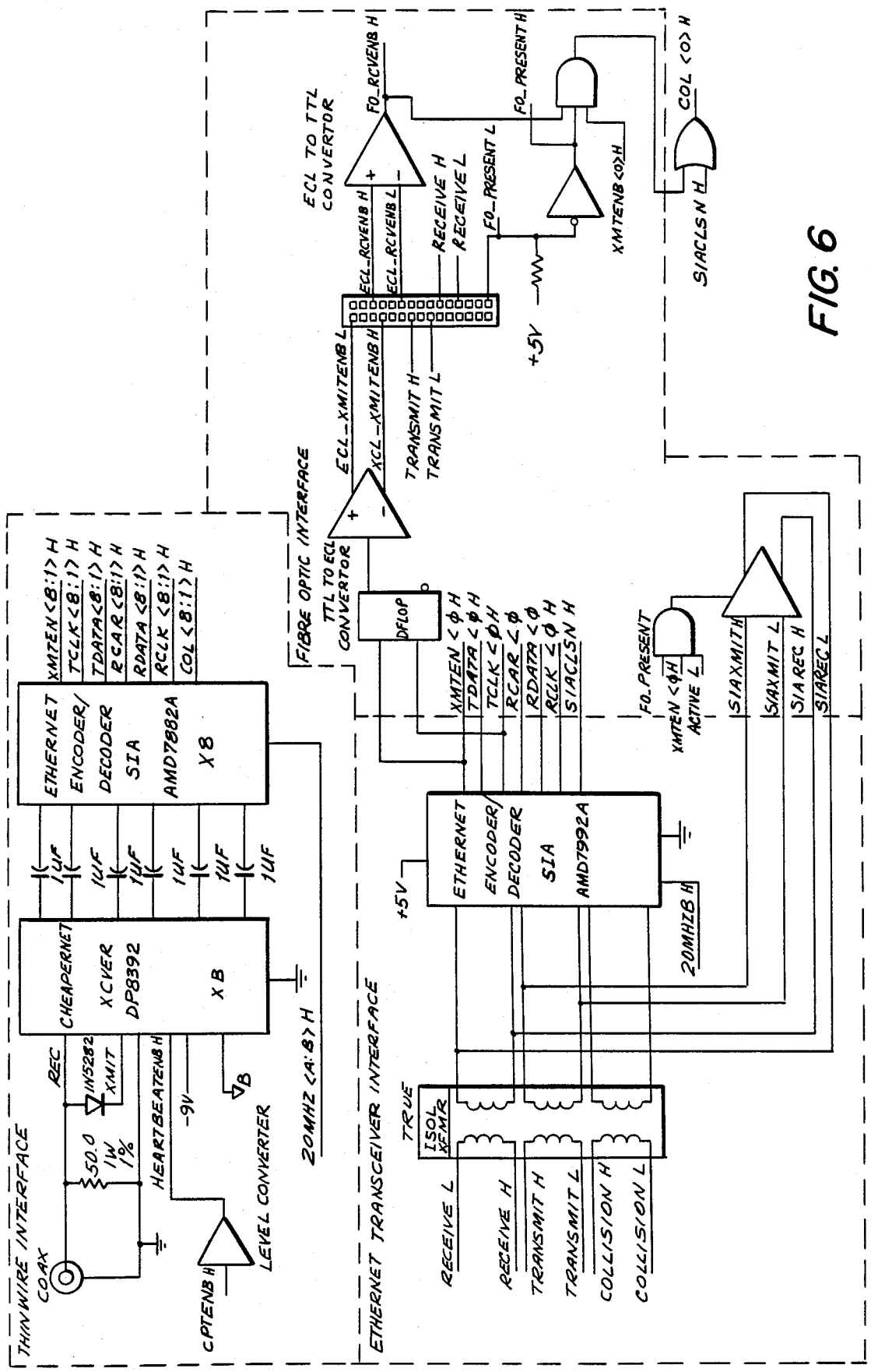
FIG. 6 is a circuit diagram illustrating the interface, the Ethernet transceiver interface and the fiber optic interface.
Figure 7:
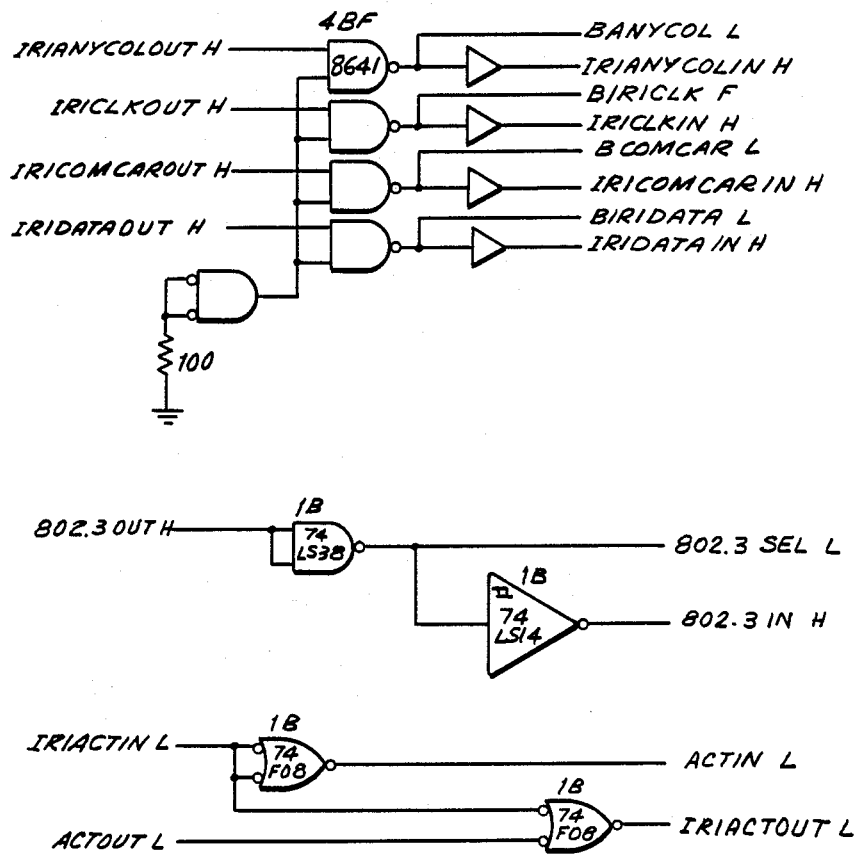
FIG. 7 is a circuit diagram of the intra repeater interconnect, buffers and receivers.
Figure 8:
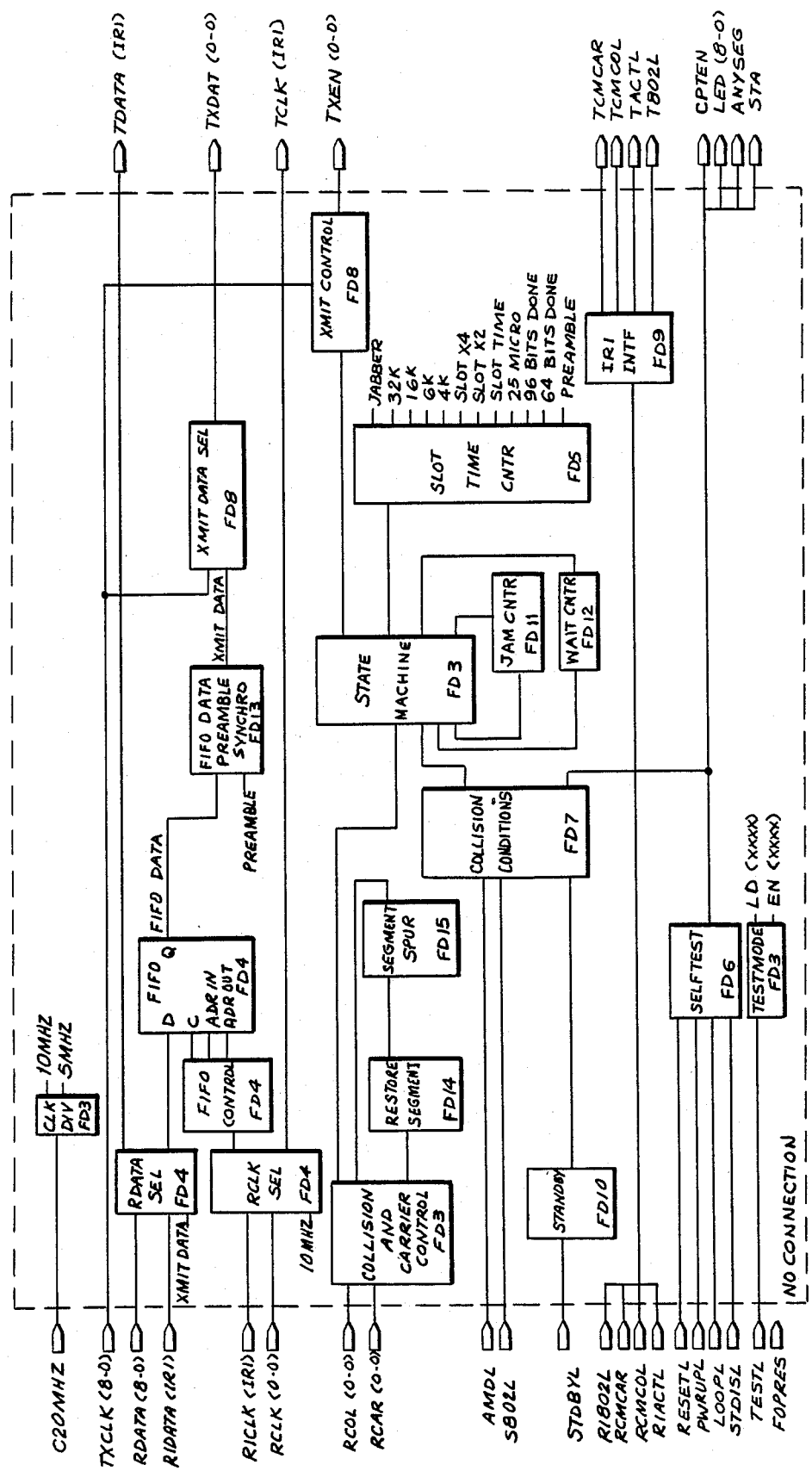
FIG. 8 is a block diagram of the hub functional partition.
Figure 10:
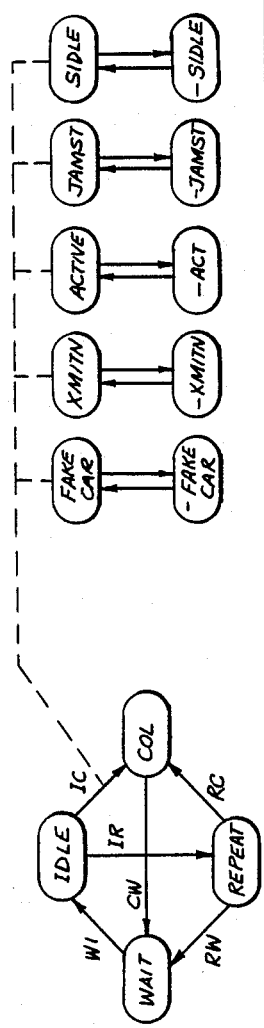
Figure 11:
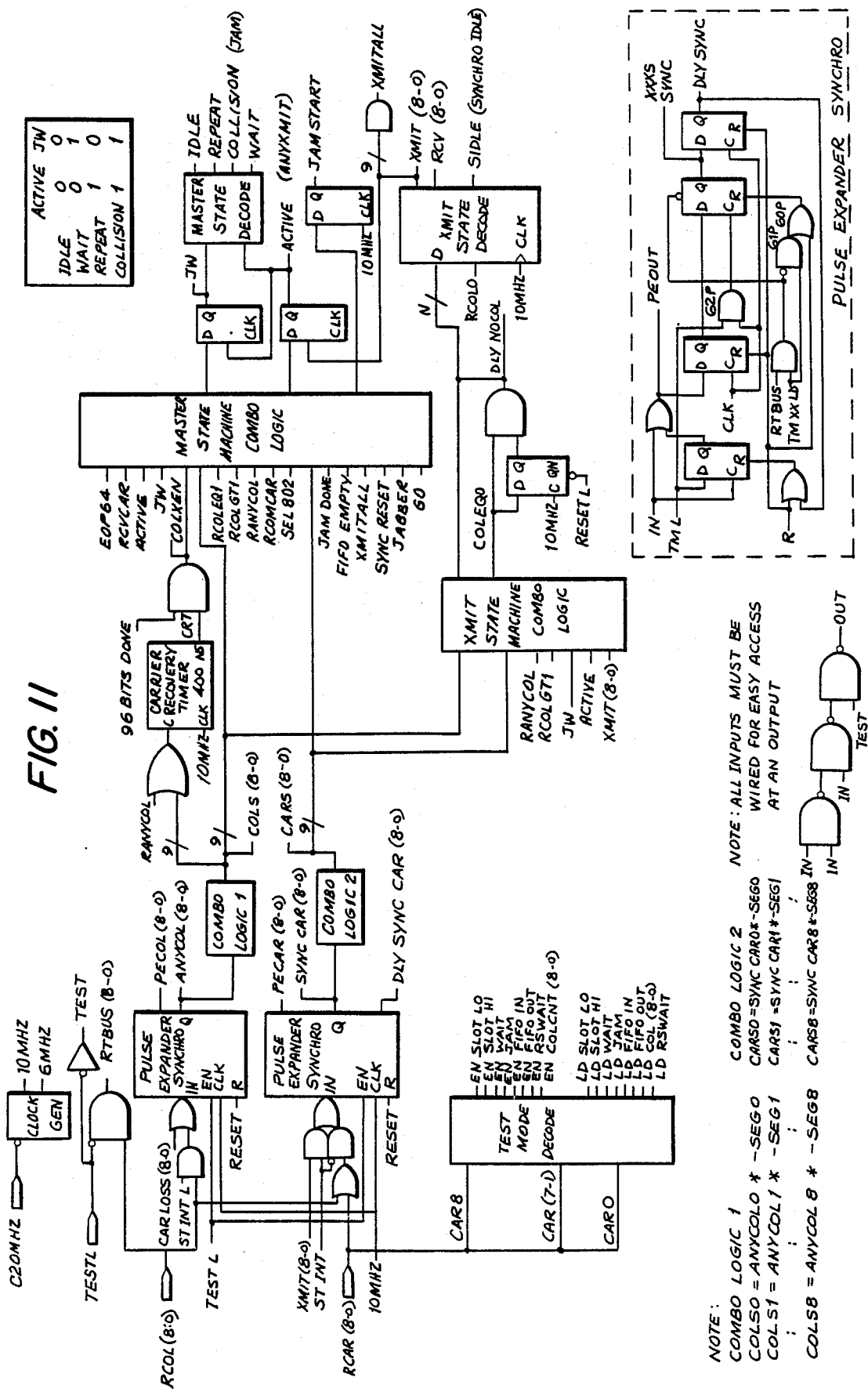
Figure 12:
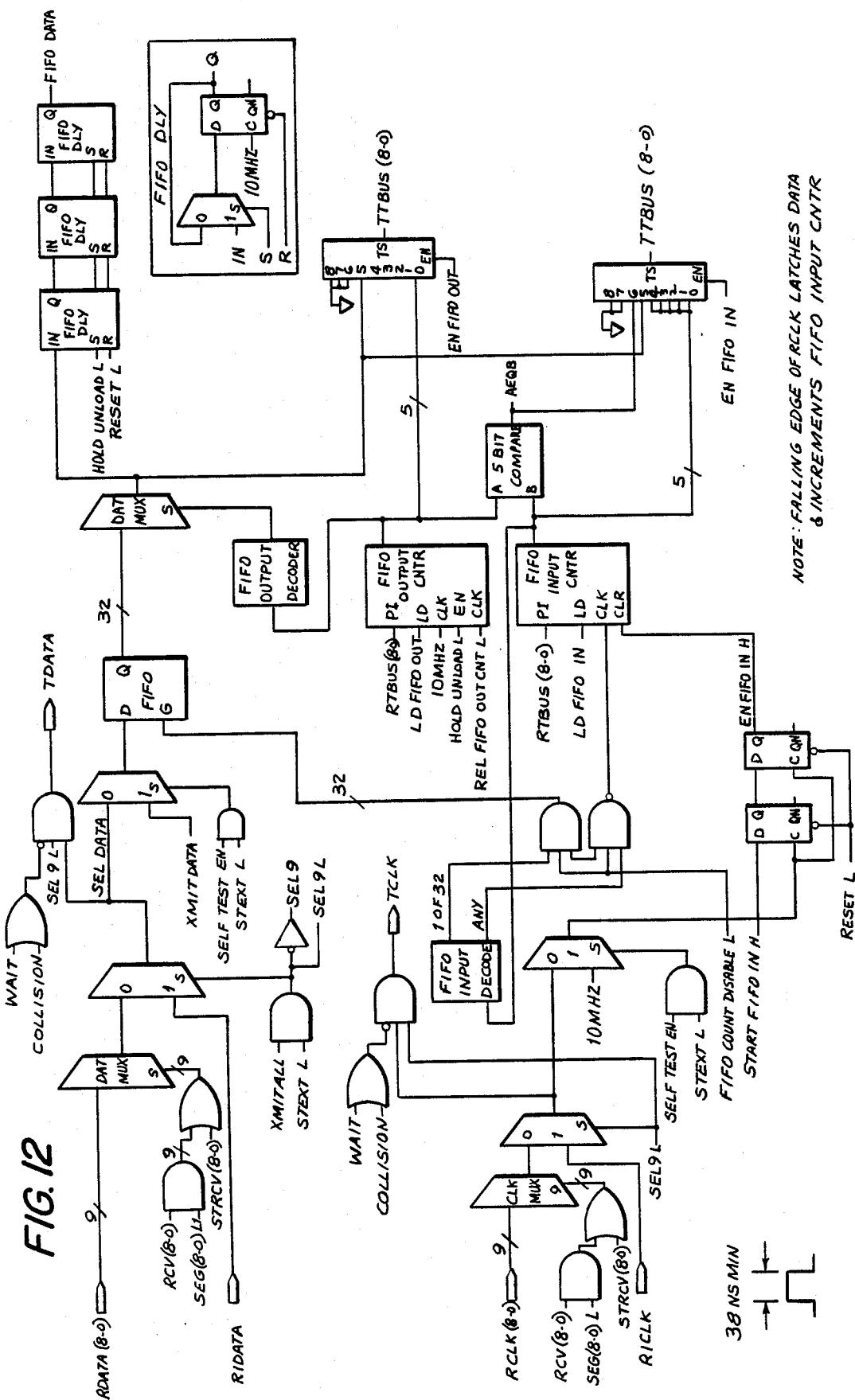
Figure 13:
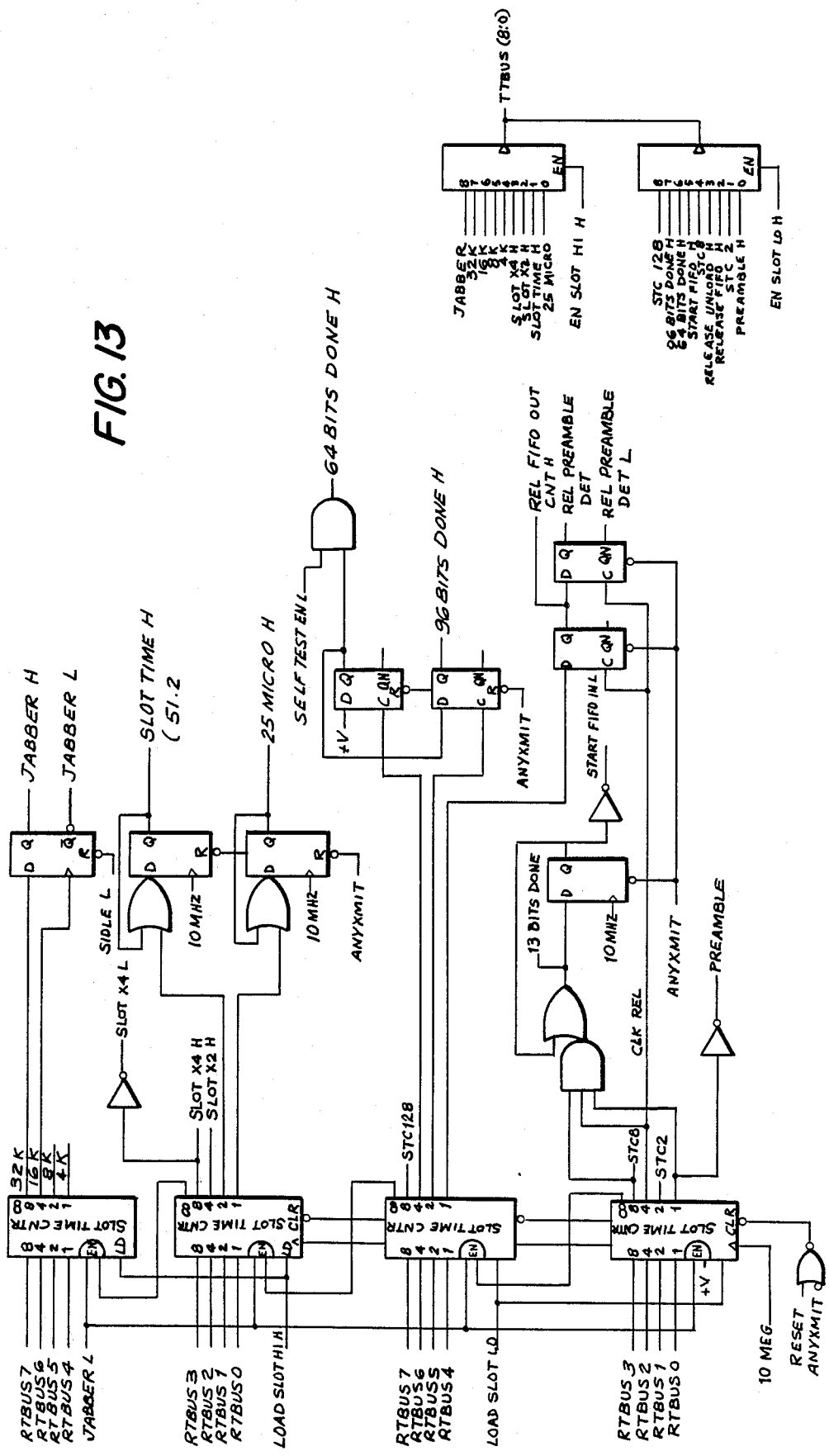
Figure 14:
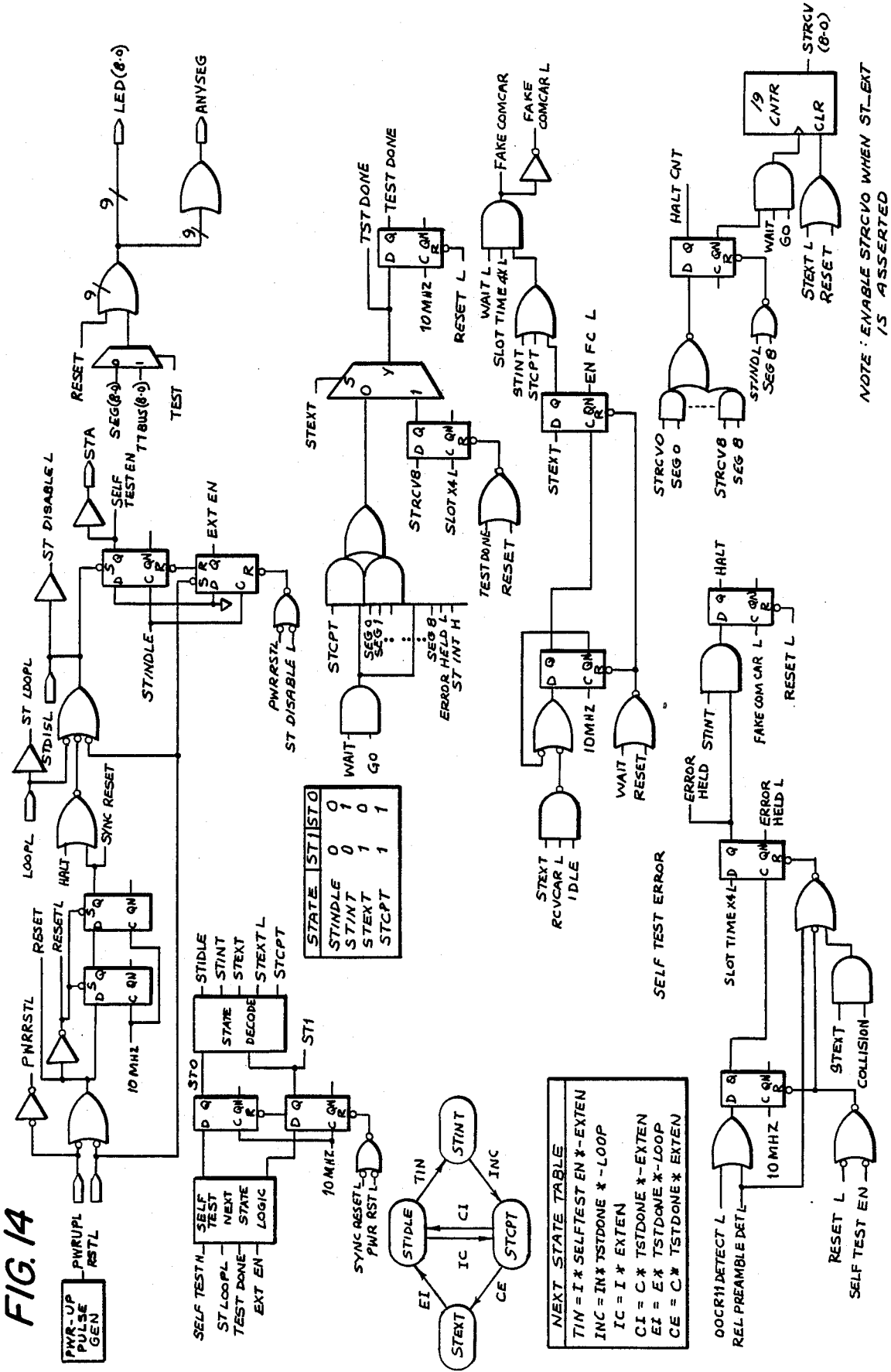
Figure 15:
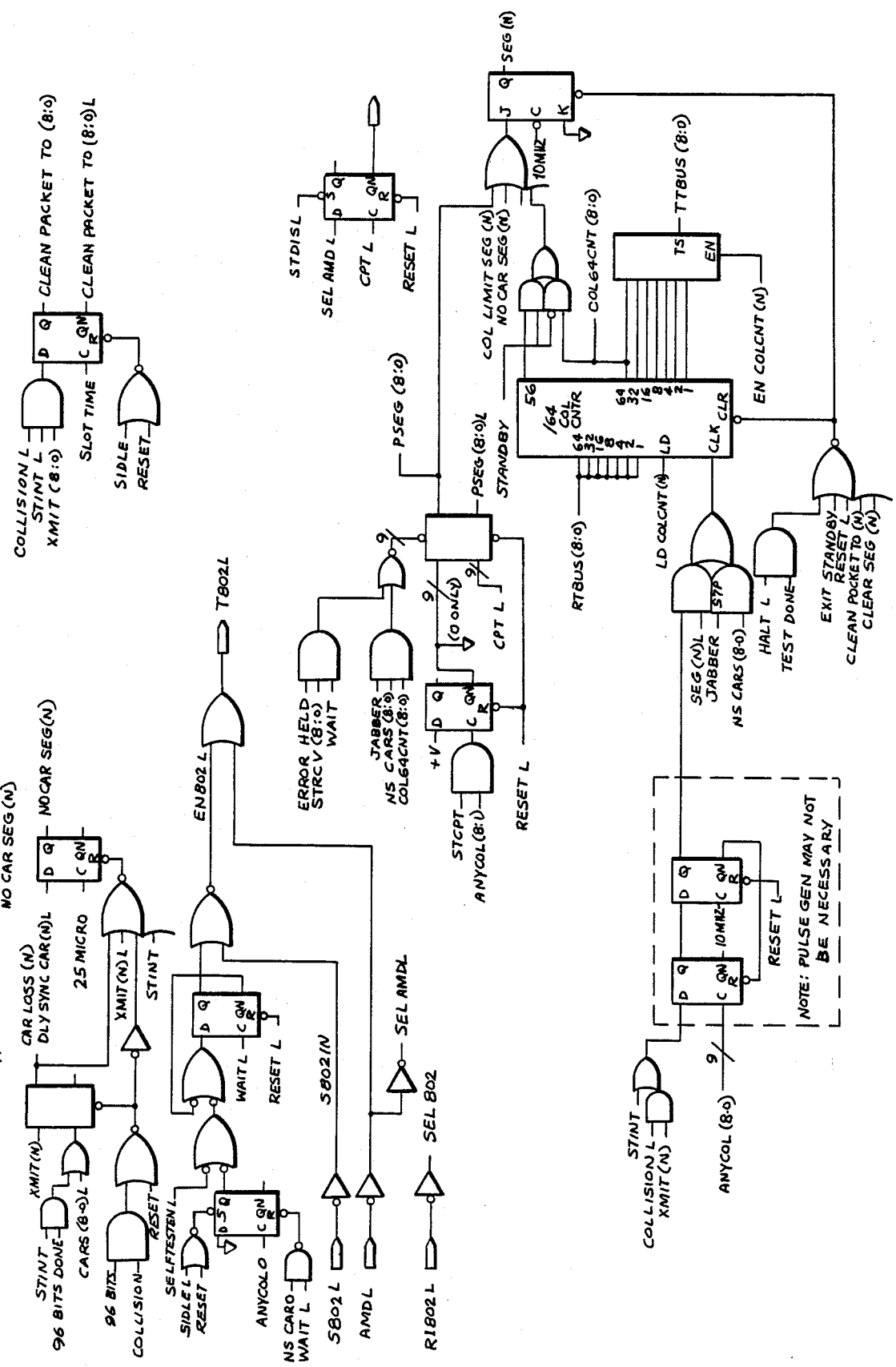
Figure 16:
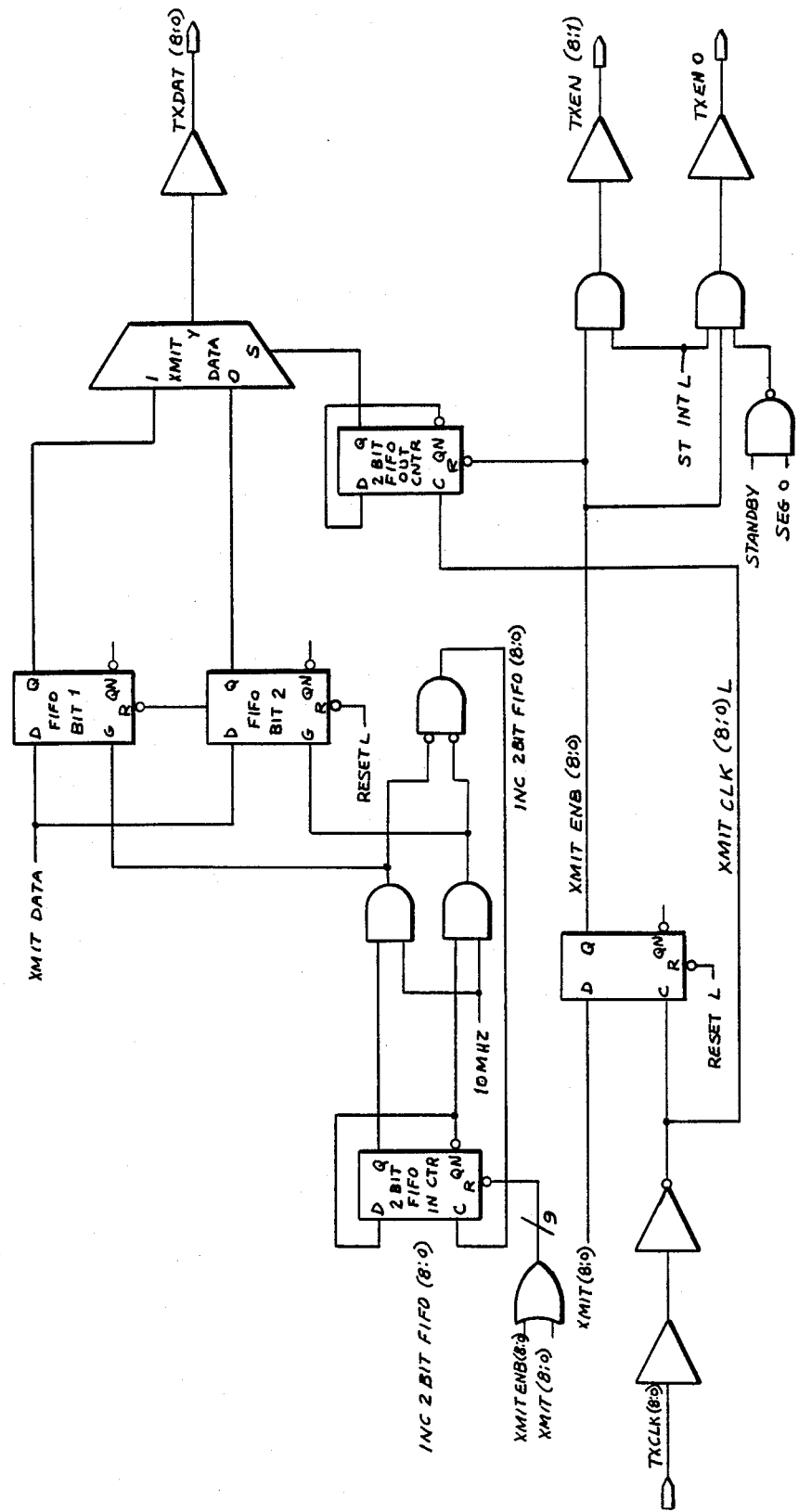
Figure 17:
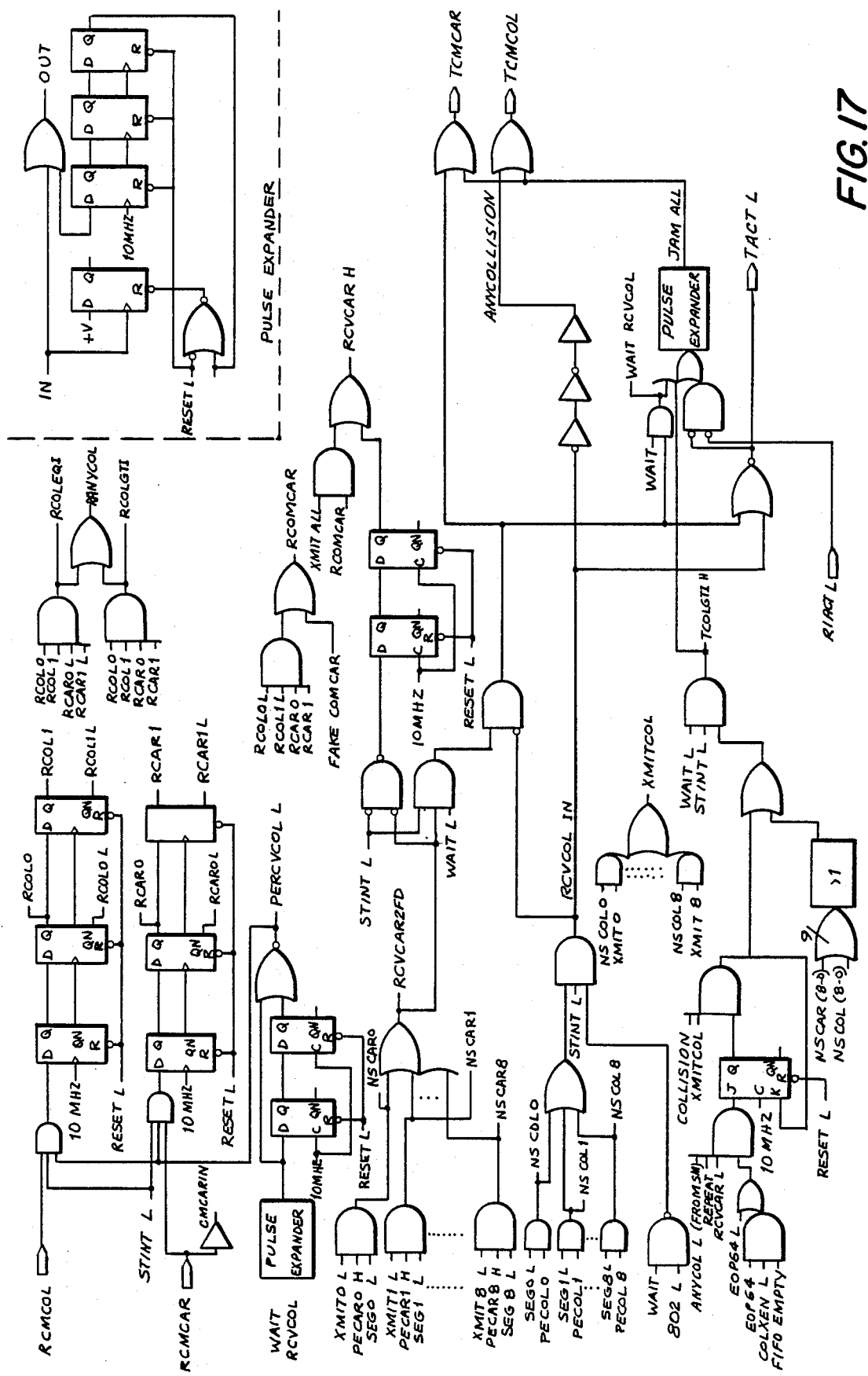
Figure 18:
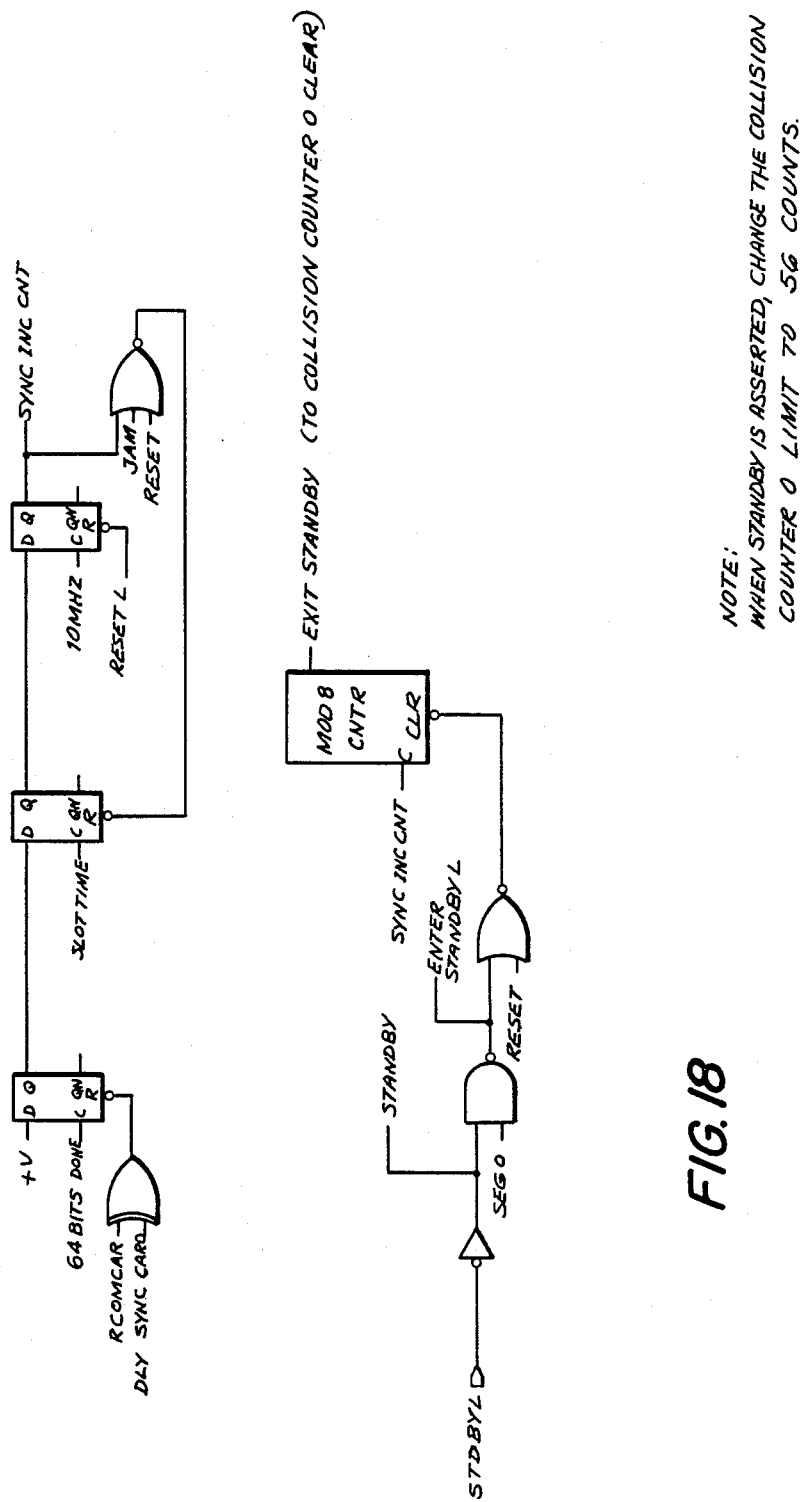
Figure 19:
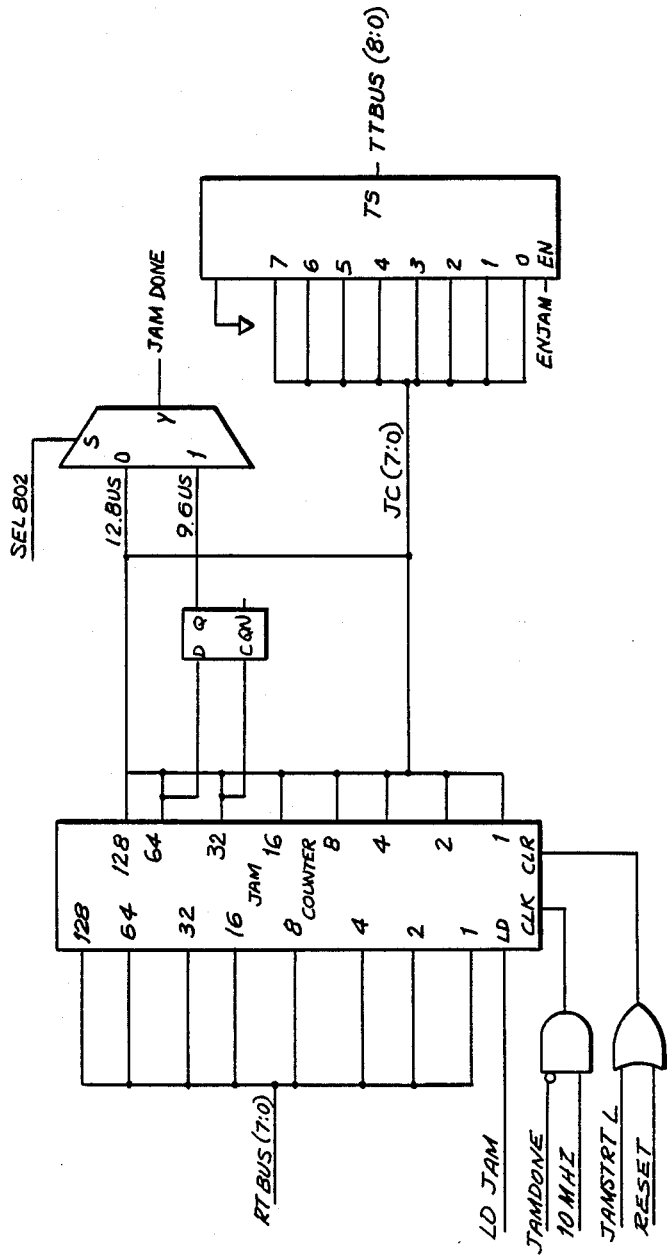
Figure 20:
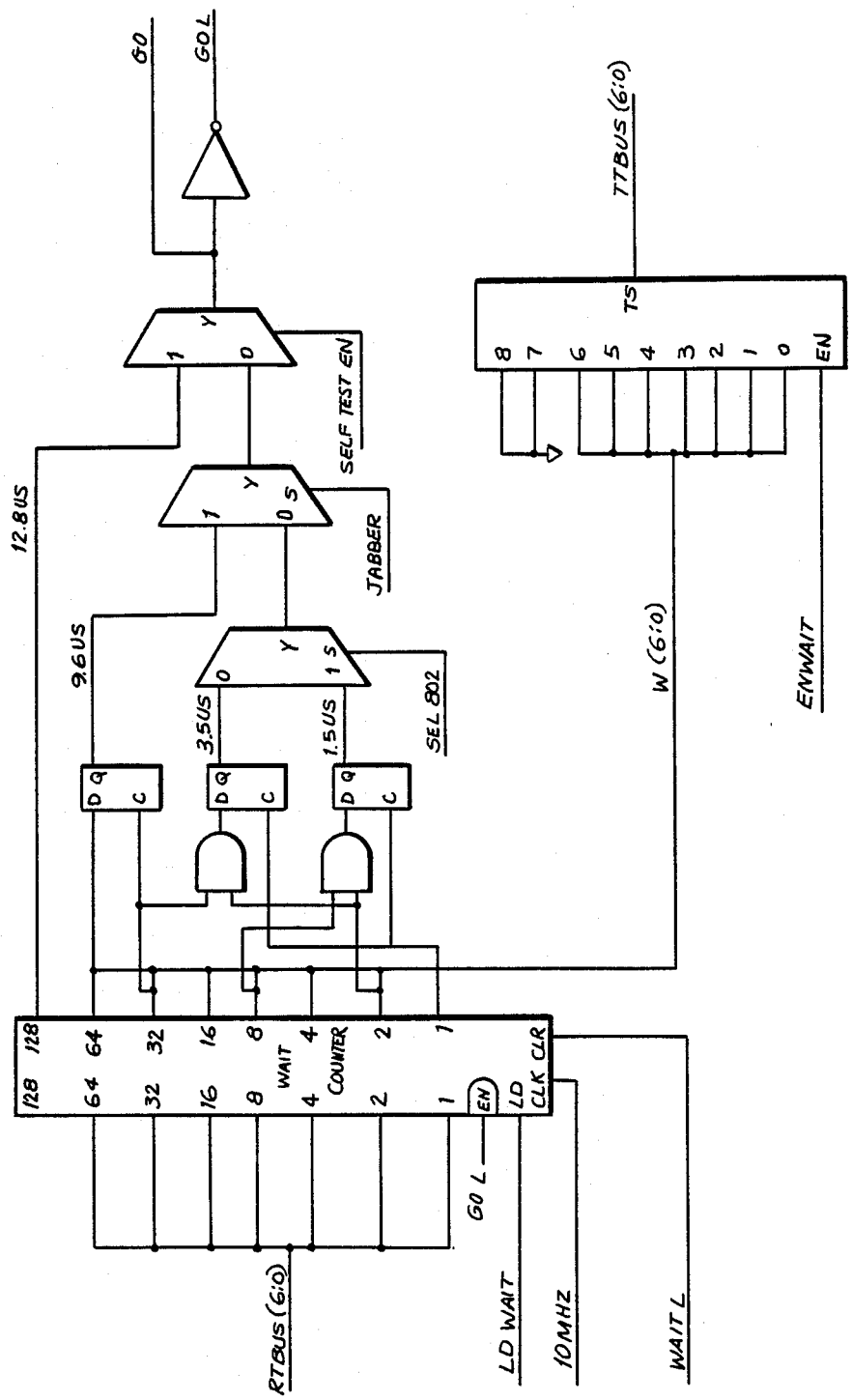
Figure 21:
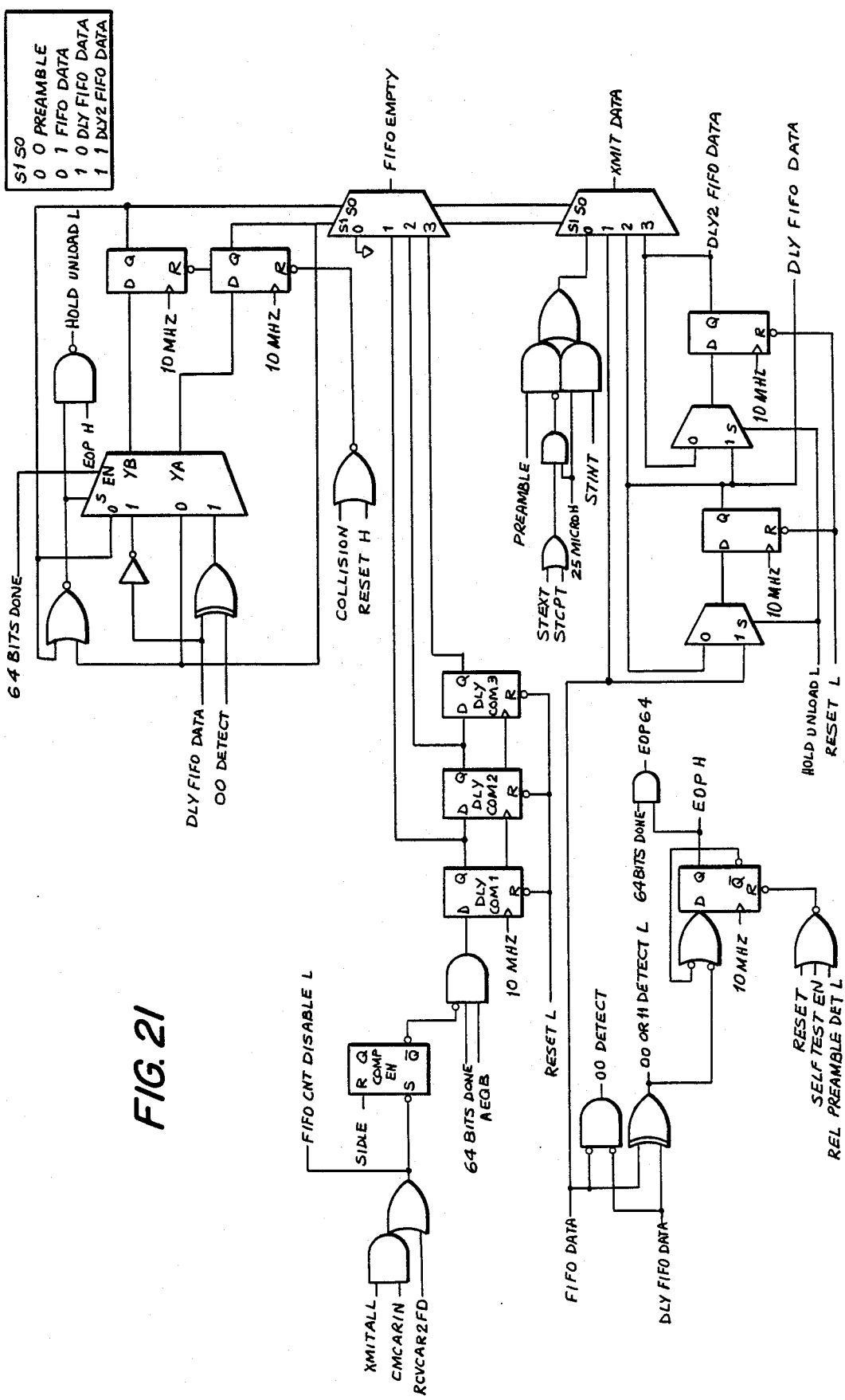
Figure 22:
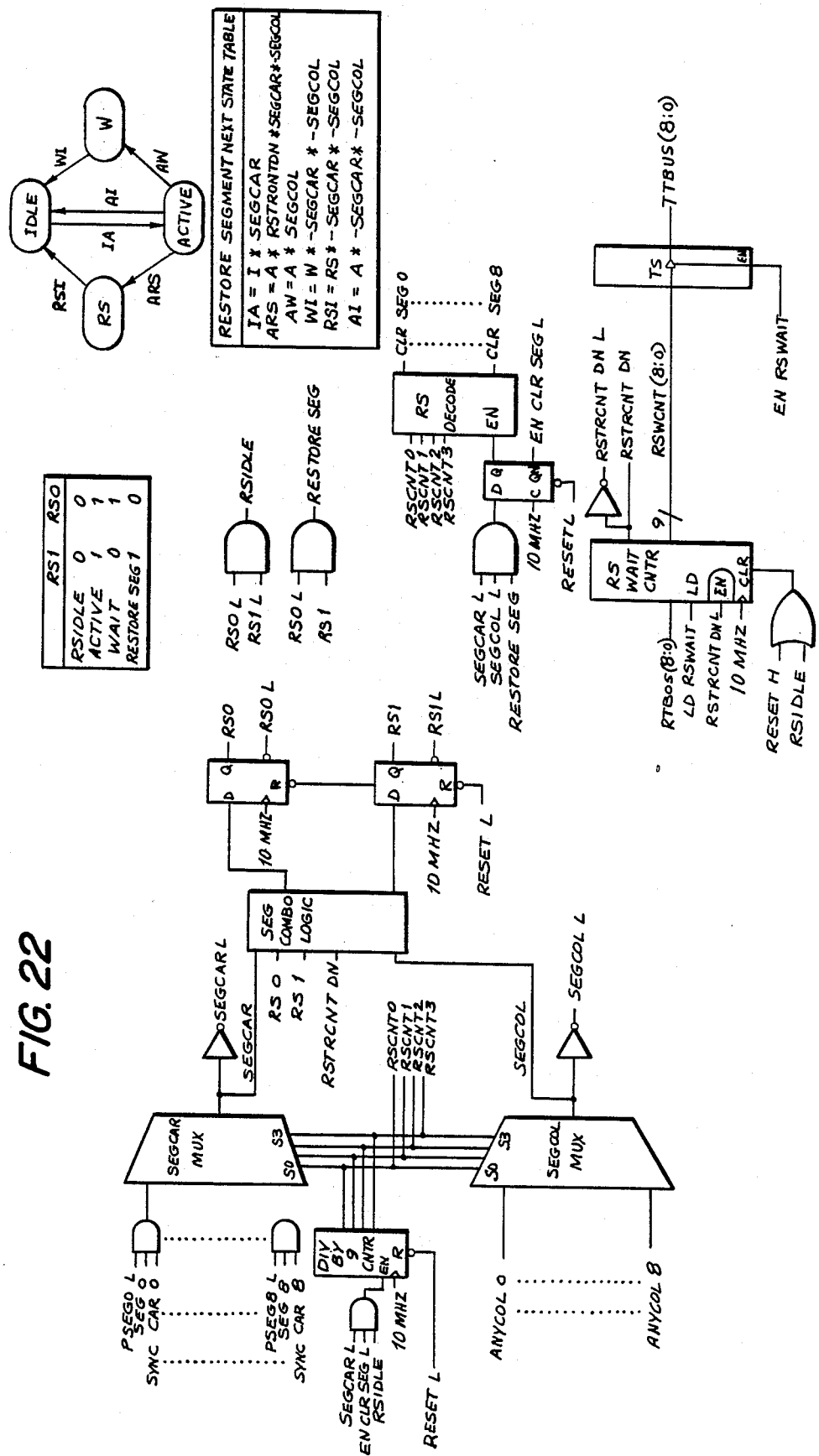
Figure 23:
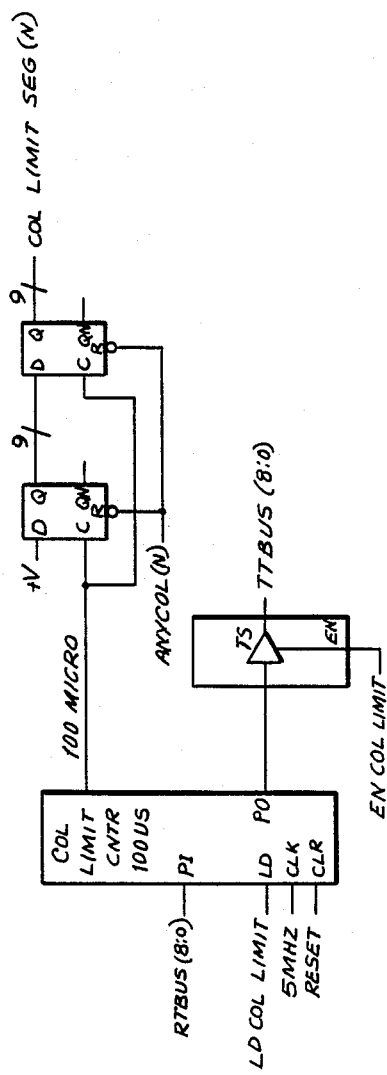

FIGS. 2 and 3 illustrate the hub state machine and the output state machine, respectfully. The following is a set of equations and signed definitions which control the flow of data to the ports of the hub. The current state of the hub is controlled by the received and collision inputs from all of the ports. Each of the ports are monitored by the state machine and transitions are determined by the condition of the inputs.

| INPUTS | |
|---|---|
| ACTIVE, JW | output of state flip-flops |
| JABBER | indicates that 48K bits have been transmitted |
| COLXEN | carrier recovery time up and 96 bits sent and no collisions |
| XMITALL | all XMIT bits are on |
| RCOLGT1 | more than one IRI collision (IRI Jam All) |
| RCOMCAR | common carrier from IRI |
| RANYCOL | any collision on the IRI (RCOLEQ1 + RCOLGT1) |
| FIFO_EMPTY | no carrier from receive port and all data sent |
| JAM_START | output of jam_start flip flop |
| JAM_DONE | output of jam timer |
| GO | wait state (heartbeat) timer done |
| XMITCOL | XMIT0*COL0 *...XMIT8*COL*8 |
| SYNC RESET | synchronous reset |
| careq0 | no local carrier |
| careq1 | single local carrier |
| cargt1 | multiple local carriers |
| coleq0 | no local collisions |
| coleq1 | single local collision |
| colgt1 | more than one local collision |
| RCVCAR | carrier drops on the receive port |
| SEL802 | IEEE 802.3 select |
| EOP64 | end of preamble and 64 bits sent |
| OUTPUTS | |
| next_state1, next_state0 | input to state flip-flops |
| JAM | in collision state |
| ACTIVE | active |
| IDLE | in idle state |
| JAM_START_INPUT | input to jam_start flip-flop |
| IC,IR RC,RW,CW | transition outputs for XMITN machines |
| IFIELD | |
| state = ACTIVE,JW | |
| OFIELD | |
| next_state = next_state1, next_state0 | |

| BIND | | |
|---|---|---|
| idle_state | = state/00 | this state assignment produces fewer terms than several others... |
| collision_state | = state/11 | |
| wait_state | = state/01 | |
| repeat_state | = state/10 | |
| idle_next_state | = next_state/00 | this state assignment produces fewer terms than several others... |
| collision_next_state | = next_state/11 | |
| wait_next_state | = next_state/01 | |
| repeat_next_state | = next_state/10 | |
| anycol = (-coleq0 + RANYCOL) | | |
| jamall = (RCOLGT1 + colgt1) | | |

CONDITIONS REQUIRED FOR STATE TRANSITIONS (a) idle_state to collision_state

The ic transition occurs whenever there is at least one collision anywhere in the system or whenever there are two or more simultaneous carriers from the 9 spurs.

$$ic=(-SYNC\_RESET*(anycol+cargt1))$$

(b) idle_state to repeat_state

The ir transition occurs whenever there is only one carrier detected from the 9 spurs or when there is an IRI carrier and no local carrier and there are no collisions in the system.

$$ir=(-SYNC\_RESET*((careq1+RCOMCAR*careq0)*(-anycol)))$$

(c) wait_state to idle_state

The wi transition occurs if the wait timer (GO) has timed out or in 802 mode and there is a collision in the system.

$$wi=(GO+SYNC\_RESET+SEL802*(anycol))$$

(d) repeat_state to collision_state

The rc transition occurs whenever there is any collision in the system or if there are no collisions and carrier drops on the receive port and 64 bits of preamble and EOP have not been sent or 96 bits have not been sent and the FIFO buffer is empty.

$$rc=(-SYNC\_RESET*(anycol+-anycol*-RCVCAR \& *(-EPO64+-COLXEN*EOP64*FIFO\_EMPTY)))$$

(e) repeat_state to wait_state

The rw transition occurs if there are no collisions in the system and the FIFO is empty or the jabber timer has timed out.

rw=(−SYNC_RESET*((COLXEN*−anycol*-FIFO_EMPTY)+JABBER))

(f) collision_state to wait_state

The cw transition occurs if there are no collisions in the system and the receive port goes inactive and 96 bits have been sent and the carrier recovery timer has timed out. Note that COLXEN asserted implies no collisions.

cw=(−SYNC_RESET*(COLXEN*−RC-VCAR*(−JAM_START+JAM_START-*JAM_DONE) & +JABBER))

EQUATIONS

Output jam is combinational, and is asserted in collision state

JAM=collision_state

Output idle is combinational, and is asserted in idle state

IDLE=idle_state

Input to the jam start flip flop

The bit is set if in the idle state there are multiple collisions detected on the IRI or on the 9 spurs, or if in the repeat state and a collision is detected on a spur that is transmitting or there are multiple collisions detected on the IRI, or in the collision state and the bit was set and the counter is not finished or the jamall condition still exists or there is a collision on a spur that is transmitting.

JAM_START_INPUT = idle_state * -SYNC_RESET * (jamall + cargt1) &
+ repeat_state * -SYNC_RESET * (RCOLGT1 + XMITCOL) &
+ collision_state * &
-SYNC_RESET*((JAM_START * -JAM_DONE) + jamall Active is a combinational output
ACTIVE=repeat_state+collision_state

STATE TRANSITION EQUATIONS

Transfer to idle when:
in wait state and get GO signal
get SYNC reset from any state
in idle state and conditions to transfer out are not true idle_next_state = wait_state * (wi) &
+ collision_state * SYNC_RESET &
+ repeat_state * SYNC_RESET &
+ (idle_state * -(ic + ir))

Transfer to collision when:
in idle state and get any collision
in repeat state and get any collision
in collision state and condition to transfer out is false collision_next_state = idle_state * ic &
+ repeat_state * rc &
+ collision_state * (-cw)

Transfer to wait state when:
in repeat state and there are no collisions and the FIFO buffer is empty
in collision state and collisions and carrier go away
in wait state and have not yet gotten GO wait_next_state = repeat_state * rw &
+ collision_state * cw &
+ wait_state * -wi Transfer to repeat state when:
in idle state and got a single carrier with no collisions
in repeat state and no collisions and FIFO buffer not empty and there is carrier repeat_next_state = idle_state * ir &
+ repeat_state * -(rc + rw)

IC=ic
IR=ir
RC=rc
RW=rw
CW=cw

| INPUTS | |
|---|---|
| ACTIVE, JW | output of state flip-flops |
| SYNC_COLN | collision from port N, synchronized and not segmented |
| SYNC_CARN | carrier from port N, synchronized and not segmented |
| XMITCOL | XMIT0*COL0+...+XMIT8*COL8 |
| XMITN | output of XMIT flip-flop N |
| JAM_START | output of jam start flip-flop |
| JAM_DONE | output of jam counter |
| RCOLGT1 | IRI jam all |
| RCOMCAR | carrier on IRI |
| RANYCOL | any collision of IRI |
| careq0 | no local carrier |
| careq1 | single local carrier |
| cargt1 | multiple local carriers |
| dlycoleq0 | no local collisions delay by a tick |
| coleq0 | no local collisions |
| coleq1 | single local collision |
| colgt1 | more than one local collision |
| IR,IC,CW,RW,RC | transition terms from global machine |
| OUTPUTS | |
| NXT_XMITN | input to XMIT flip-flop N |
| IFIELD | |
| state = ACTIVE, JW | state bits of global machine |
| BIND | |
| | states of global machine |
| idle_state | = state/00 |
| collision_state | = state/11 |
| wait_stat | = state/01 |
| repeat_state | = state/10 |
| iricol = (dlycoleq0 * RANYCOL) | collision on IRI only |
| anycol = (-coleq0 + RANYCOL) | collision anywhere |
| jamall = (RCOLGT1 + colgt1) | multiple colisions on IRI, locally, or both |

EQUATIONS

This equation is written for output XMITN. All other XMIT outputs have identical form, substituting output number for N.

Conditions for turning on XMIT bit N: The XMIT bit will be turned on from the idle state if the ir transition is true and there is carrier from one of the 9 spurs and it is not its own spur or there is carrier from only the IRI, or if in the repeat state and the XMIT bit is already on and the global machine will remain in repeat state, i.e. the repeat to wait and the repeat to collision transitions are not true, or if in the repeat state and the repeat to collision transition is true and a single collision occurs on one of the 8 other spurs, or a collision occurs only on the IRI (multiple or single) or a collision occurs on a spur that is transmitting, or in the idle state and the idle to collision transition is true and there is one collision and it is not our own port or there is a collision on the IRI or there is more than one collision on the 9 spurs or there is more than one carrier on the 9 spurs, or in the collision state and remaining there (i.e. the collision to wait transition is not true) and either: there is a collision on the IRI or the jamall condition is true or there is one collision on another input line or the XMIT bit is on and there is a collision anywhere or the jam counter is started and not done.

```
NXT__XMITN = idle__state*IR*(careq1 * -SYNC__CARN + careq0*RCOMCAR) &
+ repeat__state * XMITN * -(RW+RC) &
+ repeat__state * RC *(-(coleq1*SYNC__COLN + coleq0 * -XMITN) + iricol &
+ RCOLGT1 + XMITCOL) &
+ idle__state * IC *(-(coleq1*SYCN__COLN) + iricol + colgt1 + cargt1) &
+ collision__state *-CW*(iricol + jamal1 &
+ -SYNC__COLN*coleq1 + XMITN*-anycol + JAM__START * —JAM__DONE)
```

All timing for the hub is generated from a 20.00-MHz 0.01% oscillator. This clock is used for timing of the gate array and the transmit data. Reference is made to FIGS. 4-8 which illustrate the construction of the hub.

The major data path of the hub is via the transceiver chip from the BNC connector to the serial interface adapter (SIA) and from there to the gate array. The SIA performs all of the decoding of the Manchester data and the separation of the data and clocking signals. At this point the data is multiplexed to the proper data path. The data is then buffered in the FIFO fashion. A 32-bit buffer, operating on a first-in/first-out basis, is employed for buffering the data that is received from any one of the ports. The FIFO buffer is used to allow for speed differences within the network. It holds the data until the entire 64-bit preamble is regenerated and sent to the eight transmitting ports.

The decoding of the data is performed in the SIA chip. The encoding of the data to Manchester format on transmission is also performed by the SIA chip.

The total amount of jitter on the receive pair that the hub will properly Manchester decode with no errors is +/−20 ns or less. Jitter is defined as the edge to edge difference in the received encoded data.

The hub replicates the data of a receive if the preamble is less than 256 bits and more than 40 bits long. If these error conditions occur the FIFO may be underrun on a longer preamble and overrun on a shorter preamble. The hub will always transmit at least 63 bits of preamble.

The hub buffers all data from any port that is a valid packet in the FIFO buffer as the data bits are received. The FIFO is checked for the end of preamble (EOP) bits. This signifies the start of valid data bits in the received packet.

Upon detection of an EOP at the FIFO output before the regenerated preamble is completed, the FIFO delays the unloading of the received bits from the FIFO until the regenerated preamble is completed. Upon detection of 63 bits of regenerated preamble being sent and without having detected the EOP, the hub begins the output of data from the FIFO. This action will cause the addition of extra bits of preamble due to the additional bits of preamble in the FIFO.

The hub can detect the "11" or "00" pattern as the EOP. If no EOP is detected as in the above case, the hub will pass the data bits with the regenerated preamble as close to that of the receive.

The use of autosegmentation increases the availability of the network. The segmentation of a circuit is performed when a fault is detected on a port of the hub. The faulty line continues to receive and transmits are attempted to verify that the port is still faulty. This mode of operation on this port of the hub is known as "segmentation" or the removal of this port from active usage.

The hub will reconnect a "segmented" port of the unit when a receive is completed with no errors. An error-free receive is one with no collision detected and at least 512 bits of data.

The hub segments a port on the following conditions:
1. Excessive Collisions

A counter is incremented on each port for each successive collision of the hub and if this count reaches 64 the port is segmented.

The counter is reset on each non-collided transmission.

2. No Loopback

The hub does not receive a loopback of the transmitted data within a specified loop time.

3. Loss of Carrier

This is the failure to receive a carrier for a transmission which has been started, and is caused by a cable fault or by collisions on the cable.

Another problem which may occur is defined as "runt pockets". On transmission to a port the hub will transmit at least 96 bits of data for any received. This is to ensure that fragments are long enough for all parties to detect the presence of the collision. This is to make certain that a collision with a runt packet (not legal length) is sent through the hub. The hub will add bits to received signals that are not 96 bits long. This is done until 96 bits are transmitted.

The hub is designed so that the unit has a completely functional self-test. There are two ways of placing the unit into the self-test mode. These are:
1. Power up the Unit
2. Press the Reset Button The unit has two distinct types of self-test for isolating various faults on the unit. These are an internal self-test and an external self-test.

During the initial power up of the unit the internal self-test is run. This is run for one complete cycle of the 9 ports of the gate array and each is passed to a packet containing 256 bits of preamble and 1792 bits of data (1's). The data is looped internal to the gate array in the internal FIFO and compared. The collision counters and the segmentation of each port are checked before completion of the internal self-test. On the detection of an error on a port, this is indicated by error LEDs that are dedicated to each of the 9 ports.

The external self-test is activated by the pressing of the reset button on the rear of the unit. This test will be run after the internal test has been completed. The external test loops a packet of 256 bits of preamble and 1792 bits of data (1's) and compares the looped packet. Each of the 8 BNC ports is tested and also the Ethernet port. The test also checks for the loss of carrier and the loopback capability of the transceiver chips.

The hub is capable of running the internal self-test in a continuous mode when the LoopOnTest jumper is installed. This mode is run until the reset button is sensed and the hub runs one more pass of self-test and enters a mode of continuous external self-test. These are diagnostic features for burning the units and for service personnel. The jumper for this is accessable to the user without opening the enclosure.

A collision presence test is performed after the transmit of a good packet to all of the ports externally. On the detection of the completion of the transmission, the collision presence test will generate a burst of 6 transitions at the normal 10-MHz rate. The hub checks to make certain that this short burst of data occurs after an external transmit on each port. After the external part of the self-test is completed, the generation of the collision presence test is disabled on all of the ports. This is a function that is only performed during the self-test. The transceiver heartbeat is disabled after completion of the self-test.

STANDBY MODE

It is possible to operate two hub units on the same Ethernet coax via two H4000s when the IRI port is in use in multiple hub applications. The number of hubs that can be attached to the coax is a maximum of two. The second connection will be the backup path to the Ethernet coax. The second unit must have the "standby" switch in the standby position. The primary hub must be in the "active" switch position. All of the remaining hub units of the daisy chain can be set to any mode (standby/active). These units will segment the Ethernet transceiver port due to a lack of loopback path.

The primary hub will be replaced by the standby unit if the standby unit records a predetermined number of valid packets that are not repeated to the Ethernet port. Only one of the hubs on any given Ethernet cluster can be the primary unit.

The hub can be configured to operate in compliance with an 802.3 jumperover time of 1.0 $\mu$sec and 96-bit preamble. The unit can do this automatically on the first transmit after self-test. A test is performed to see if the heartbeat is within the 3.2 $\mu$sec window. This will then assume 802.3 operation if the heartbeat is not present. The jumper for 802.3 is removed to prevent the test from occurring.

FIG. 9 illustrates how a cluster of hubs are coupled together. Each hub has an IRI port which serves as the interconnect point between the hubs. An IRI cable is employed for coupling the hubs together in a daisy-chain fashion.

The IRI cable has two ends, wherein one end has a male connector for coupling into the IRI port on the hub and the other end has both a male and a female connector, wherein the male connector is for coupling to an IRI port on another hub, and the female connector is for coupling to another IRI cable. The following is a description of the signals on each of the pins illustrated in FIG. 9:

The IRI is to be used when the need for more than one hub is required and the user does not wish to install an additional transceiver. The additional hubs are connected via the 9-pin D type connector. The termination of the cable can be made by placing a termination connector at the far end of the connected units. All of the hubs monitor a common bus for the following signals: carrier, receiveclock, receivedata and collision. These are the "OR" of the 8 channels of the respective signals. In addition, an activity signal is passed from each unit for the indication of the completion of jams.

It is also to be understood that the following claims are intended to cover all of the generic and specific features of the invention herein described.

We claim:

1. A method for transmitting a packet of information including a preamble and data throughout a local area network comprising a multiport repeater having a plurality of ports for respectively connecting an end of each of a plurality of coaxial cables to said repeater, a port for connecting a transceiver cable to said repeater, FIFO buffer means, and repeating means, comprising the steps of:
    (a) storing information received on one of said ports in said FIFO buffer means;
    (b) regenerating a preamble in response to storage of said received information and transmitting said regenerated preamble on all of said ports except for said one port;
    (c) detecting an end of said received preamble at the output of said buffer means and;
    (d) always replicating the information stored in said buffer on all of said ports except for said one port in response to completion of said regenerated preamble.

2. The method as defined in claim 1, further comprising the step of delaying the output of the data in said buffer in response to detection of said end of preamble prior to completion of said regenerated preamble.

3. A method for transmitting received data throughout a local area network comprising a multiport repeater having a plurality of ports for respectively connecting an end of each of a plurality of coaxial cables to said repeater, a port for connecting a transceiver cable to said repeater, FIFO buffer means, and repeating means, comprising the steps of:
    (a) storing data received on one of said ports in said FIFO buffer means;
    (b) always replicating the data stored in said buffer means on all of said ports except for said one port.

4. A local area network comprising first, second and third multiport repeaters, each multiport repeater having a repeater interconnect port, a plurality of local ports and repeating means for coupling all data received at one port of said repeater for transmission at all other ports of said repeater, first, second and third pluralities of signal connection means coupled to said pluralities of local ports of said first, second and third multiport repeaters respectively, first, second and third repeater interconnection means coupled to said repeater interconnect ports of said first, second and third multiport repeaters respectively, and a repeater interconnect bus means connected to each of said repeater interconnection means at different junctions therealong, whereby data transmitted by a device coupled to any one of said signal connection means is received by all other devices coupled to said pluralities of signal connection means.

5. The local area network as defined in claim 4, wherein each of said multiport repeaters further comprises restoring means for restoring timing margins in said repeated data and regenerating means for regenerating a preamble.

6. The local area network as defined in claim 4, further comprising a transceiver and transceiver connection means, wherein said first multiport repeater further comprises a transceiver connection port, said transceiver being connected to said transceiver connection port by way of said transceiver connection means.

7. The local area network as defined in claim 4, wherein said restoring means comprises a first-in/first-out buffer means for storing said preamble and said data received at said one port, and means for detecting an end of said received preamble at an output of said buffer means, wherein in response to detection of an end of said received preamble at said buffer means output before completion of said regenerated preamble by said regenerating means, said buffer means delays the output of said received data until said regenerated preamble is completed.

8. A global local area network connected to a standard Ethernet coaxial cable by means of transceiver, said local area network comprising first, second and third multiport repeaters, each multiport repeater having a repeater interconnect port, a plurality of local ports and repeating means for coupling all data received at one port of said repeater for transmission at all other ports of said repeater, first, second and third pluralities of signal connection means coupled to said pluralities of local ports of said first, second and third multiport repeaters respectively, first, second and third repeater interconnection means coupled to said repeater interconnect ports of said first, second and third multiport repeaters respectively, and a repeater interconnect bus means connected to each of said repeater interconnection means at different junctions therealong, said first multiport repeater having a transceiver connection port connected to said transceiver by a transceiver connection means, whereby data transmitted by a device coupled to any one of said signal connection means is received by all other devices coupled to said pluralities of signal connection means, and wherein each of said signal connection means has higher signal attenuation and lower resistance to interference than said standard Ethernet coaxial cable.

9. The local area network as defined in claim 8, wherein each of said multiport repeaters further comprises restoring means for restoring timing margins in said repeated data and regenerating means for regenerating a preamble.

* * * * *